United States Patent
Amagasa et al.

(10) Patent No.: US 8,800,095 B2
(45) Date of Patent: Aug. 12, 2014

(54) WIPER DRIVING APPARATUS

(71) Applicants: Toshiyuki Amagasa, Kiryu (JP); Hiroji Okabe, Kiryu (JP)

(72) Inventors: Toshiyuki Amagasa, Kiryu (JP); Hiroji Okabe, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days.

(21) Appl. No.: 13/683,581

(22) Filed: Nov. 21, 2012

(65) Prior Publication Data

US 2013/0081221 A1    Apr. 4, 2013

Related U.S. Application Data

(62) Division of application No. 12/448,650, filed as application No. PCT/JP2007/074952 on Dec. 26, 2007, now Pat. No. 8,453,290.

(30) Foreign Application Priority Data

Dec. 26, 2006 (JP) ................................. 2006-348760
Dec. 26, 2006 (JP) ................................. 2006-348884

(51) Int. Cl.
*B60S 1/06* (2006.01)
*B60S 1/08* (2006.01)

(52) U.S. Cl.
USPC ....... 15/250.17; 15/250.3; 318/443; 318/484; 318/DIG. 2

(58) Field of Classification Search
USPC ............... 15/250.16, 250.17, 250.3; 318/443, 318/444, 484, DIG. 2; 701/36
See application file for complete search history.

(56) References Cited

U.S. PATENT DOCUMENTS 2,264,013 A * 11/1941 Webb .......................... 15/250.17
4,728,870 A    3/1988 Hirano et al.
4,947,092 A * 8/1990 Nabha et al. .................. 318/444
6,798,163 B2   9/2004 Weiler

FOREIGN PATENT DOCUMENTS

| DE | 10044924 A | 4/2002 |
| JP | 62-103248 A | 5/1987 |
| JP | 5-178167 A | 7/1993 |
| JP | 7-329768 A | 12/1995 |
| JP | 2003-526567 A | 9/2003 |

OTHER PUBLICATIONS

Office Action mailed on Nov. 21, 2012 in parent U.S. Appl. No. 12/448,650.

* cited by examiner

*Primary Examiner* — Gary Graham
(74) *Attorney, Agent, or Firm* — Kenyon & Kenyon LLP

(57) ABSTRACT

The present invention relates to a wiper apparatus in which it is easy to replace a wiper blade without this leading to any erroneous operation. When a wiper operation has been stopped by a wiper driving apparatus 31, the wiper driving apparatus causes the wiper arms to first move to a housing position and then stops the wiper arms. When wiper blades are to be replaced, an IG switch 33 is turned off during a wiper operation. If the IG switch 33 is turned off while the wiper arms are within a first stopping range, then the wiper arms are stopped at that position and the blades are replaced. If the wiper arms are stopped outside the first stopping range, then they are first moved to a bottom inverted position or a housing position and are then stopped.

7 Claims, 10 Drawing Sheets

WIPER DRIVING APPARATUS

CROSS-REFERENCE TO RELATED APPLICATIONS

This application is a division of U.S. Patent Application Ser. No. 12/448,650, filed on Jun. 25, 2009, which claims benefit of and priority to International Application Ser. No. PCT/JP2007/074952, filed on Dec. 26, 2007, which claims benefit of and priority to Japanese Patent Application JP2006-348760, filed on Dec. 26, 2006, and Japanese Patent Application JP2006-348884, filed on Dec. 26, 2006, the entire contents of each of which are expressly incorporated herein by reference.

TECHNICAL FIELD

The present invention relates to a wiper driving apparatus which is mounted in a vehicle and is used to control a wiper apparatus.

Priority is claimed on Japanese Patent Application Nos. 2006-348760 and 2006-348884, filed Dec. 26, 2006, the contents of which are incorporated herein by reference.

TECHNICAL BACKGROUND

A wiper apparatus which wipes off rain or spray from a preceding vehicle or the like which has adhered to the windshield and thereby ensures visibility for the driver is provided in a vehicle. A wiper apparatus has a wiper arm whose oscillation is controlled by a wiper driving apparatus, and a wiper blade which is placed against the windshield and is fitted onto the distal end of the wiper arm. The wiper blade is removably attached to the wiper arm so that it can be replaced when the rubber becomes worn.

Here, in some wiper apparatuses, the wiper blades are able to be housed inside the bonnet hood when they are not in use. In this type of wiper apparatus, it is difficult to replace the wiper blades while they are housed inside the bonnet hood. Therefore, for example, as is disclosed in Patent document 1, a structure has been developed in which a button which is used when replacement is necessary is newly provided on a control panel in the vehicle interior which operates the wiper apparatus, and when this button is pressed the wiper blade is moved from its housed position to a top inverted position. This replacement button is placed alongside a wiper switch and the like which causes the wiper arm to operate normally.
[Patent document 1] German Patent Application Laid-Open No. 10044924

DISCLOSURE OF THE INVENTION

Problems to be Solved by the Invention

However, if this replacement button is provided on the control panel, although it is easy to operate, because it is placed alongside the wiper switch there has been cases when a user presses this replacement button by mistake.

Moreover, when a driver changes from a vehicle without this control function of housing a wiper blade inside the bonnet hood to a vehicle which does have a control function such as that disclosed in Patent document 1, because the driver is further burdened with the task of pressing this replacement button, some drivers have felt that this system is somewhat troublesome and annoying.

In addition, because this replacement button is newly provided, restrictions on the layout of the control panel are created.

This invention was conceived in view of these circumstances and it is a principal object thereof to make it easy to replace a wiper blade without this leading to any erroneous operation.

Means for Solving the Problem

In order to solve the above described problems, a first aspect of the present invention is a wiper driving apparatus which is provided with a wiper operating unit which causes wiper arms which are fitted with wiper blades that come into contact with a windshield to oscillate between a top inverted position and a bottom inverted position, wherein when a wiper switch has been turned ON and the wiper arms are operating, then if an ignition switch is turned OFF while the wiper arms are within a first stopping range, the wiper operating unit causes the wiper arms to stop at that position, while if the ignition switch is turned OFF while the wiper arms are outside the first stopping range, the wiper operating unit causes the wiper arms to first move to the bottom inverted position or to a housing position and thereafter stops the wiper arms.

In this wiper driving apparatus, if a stopping operation is performed while the wiper arms are within a first stopping range, the wiper arms are stopped at that position. If, however, a stopping operation is performed while the wiper arms are outside this stopping range, the wiper arms are moved to a bottom inverted position or a housing position. The driver is able to select the wiper blade stopping position while confirming it visually.

A second aspect of the present invention is the wiper driving apparatus according to the first aspect in which it is also possible for the first stopping range top include the top inverted position and a range of up to 20° from the top inverted position.

In this wiper driving apparatus, because the first stopping position is in the vicinity of the top inverted position, the task of replacing the wipers is simplified.

A third aspect of the present invention is a wiper driving apparatus which is provided with a wiper operating unit which causes wiper arms which are fitted with wiper blades that come into contact with a windshield to oscillate between a top inverted position and a bottom inverted position, wherein when a wiper switch has been turned ON and the wiper arms are operating, then if an ignition switch is turned OFF while the wiper arms are within a first wiping range, the wiper operating unit causes the wiper arms to stop within the first wiping range. If the ignition switch is turned OFF while the wiper arms are within a second wiping range which is on the bottom inverted position or housing position side of the first wiping range, the wiper operating unit cause the wiper arms to stop within the first wiping range. If the ignition switch is turned OFF while the wiper arms are within a third wiping range which includes the bottom inverted position or the housing position, the wiper operating unit first moves the wiper arms to the bottom inverted position or the housing position and then causes the wiper arms to stop.

In this wiper driving apparatus, if the wiper arms are stopped after they have gone past the first wiping range where the blade replacement position is located, then if they are within the second wiping range which is close to the first wiping range, they are first returned to the first wiping range and are then stopped. If the wiper arms are stopped past the first wiping range and close to the bottom inverted position or housing position, then the wiper arms are stopped in the bottom inverted position or housing position.

A fourth aspect of the present invention is the wiper driving apparatus according to the third aspect in which, when the wiper arms are moving from the top inverted position towards the bottom inverted position, if the ignition switch is turned OFF while the wiper arms are within the second wiping range, then it is also possible for the wiper operating unit to cause the wiper arms to first return to the bottom inverted position and thereafter move to within the first wiping range, and then to cause the wiper arms to stop within the first wiping range.

If the wiper arms are stopped within the second wiping range, this wiper driving apparatus drives the wiper arms as in a normal wiping operation and then stops them within the first wiping range.

A fifth aspect of the present invention is the wiper driving apparatus according to the third or fourth aspects in which it is also possible for a structure to be employed in which, when the ignition switch is switched from OFF to ON, the wiper operating unit causes the wiper arms to move to the bottom inverted position or the housing position.

In this wiper driving apparatus, when the ignition switch is turned ON after the blades have been replaced, the wiper arms move to the bottom inverted position or housing position as a returning action. After this movement, if the wiper switch is turned OFF, the wiper arms stop at this position. If the wiper switch is turned ON, a normal wiping operation is implemented.

A sixth aspect of the present invention is a wiper driving apparatus which is provided with a wiper operating unit which causes wiper arms which are fitted with wiper blades that come into contact with a windshield to oscillate between a top inverted position and a bottom inverted position, wherein when a first switch which is provided in a vehicle interior has been turned ON and a second switch which is provided in a vehicle interior is changed from OFF to ON, the wiper operating unit causes the wiper arms to move to a predetermined first stop position.

In this wiper driving apparatus, when a first and second switch are operated, the wiper arms move the wiper blades to the first stop position. If only one switch is operated, then there is no movement to the first stop position.

A seventh aspect of the present invention is the wiper apparatus according to the sixth aspect in which it is also possible for the first switch to be an automatic return switch and for the second switch to be an ignition switch.

In this wiper driving apparatus, because the first switch is an automatic return switch, it automatically turns OFF when not being operated by a user. Moreover, because it is necessary for the ignition switch to be operated at the same time, any mistaken operation is prevented.

An eighth aspect of the present invention is the wiper apparatus according to the sixth or seventh aspects in which it is also possible for the first stop position to include the top inverted position and a range of up to 20° from the top inverted position.

In this wiper driving apparatus, because the first stop position is a predetermined range which includes the top inverted position, the task of replacing the wiper blades is simplified.

A ninth aspect of the present invention is the wiper apparatus according to the sixth through eighth aspects in which it is also possible for the first switch to be a mist switch which is electrically connected to the wiper operating unit.

In this wiper driving apparatus, because a mist switch is used, it is difficult for any erroneous operation to occur.

A tenth aspect of the present invention is the wiper driving apparatus according to the sixth through ninth aspects in which, when a switch which operates the wiper arms or a switch which discharges jets of washing liquid has been turned ON and the second switch which is provided in a vehicle interior is changed from OFF to ON, it is also possible for the wiper operating unit to cancel the stopping of the wiper arms at the first stop position.

In this wiper driving apparatus, two switches are also used for the return of the wiper arms from the first stop position. Because these two switches are not normally used together, it is difficult for any erroneous operation to occur.

Effects of the Invention

According to the present invention, because a structure is employed in which, when the wiper arms are stopped within a predetermined range, they are stopped at a position where blade replacement can be performed, while when the wiper arms are stopped outside the predetermined range, they are moved to a bottom inverted position or housing position, the task of replacing the wiper blades is simplified.

Moreover, because two switches are operated in order to cause the wiper arms to stop at the first stop position, it is difficult for any erroneous operation to occur. If the wiper blade replacement is performed at the first stop position, then this task is easily performed.

Because a structure is employed in which, when the wiper arms are stopped within the first stop range, they are stopped at that position, while if they are stopped outside this stop range, they are moved to the bottom inverted position or housing position, the task of replacing the wiper blades is simplified.

DESCRIPTION OF THE REFERENCE NUMERALS

Figure 1:
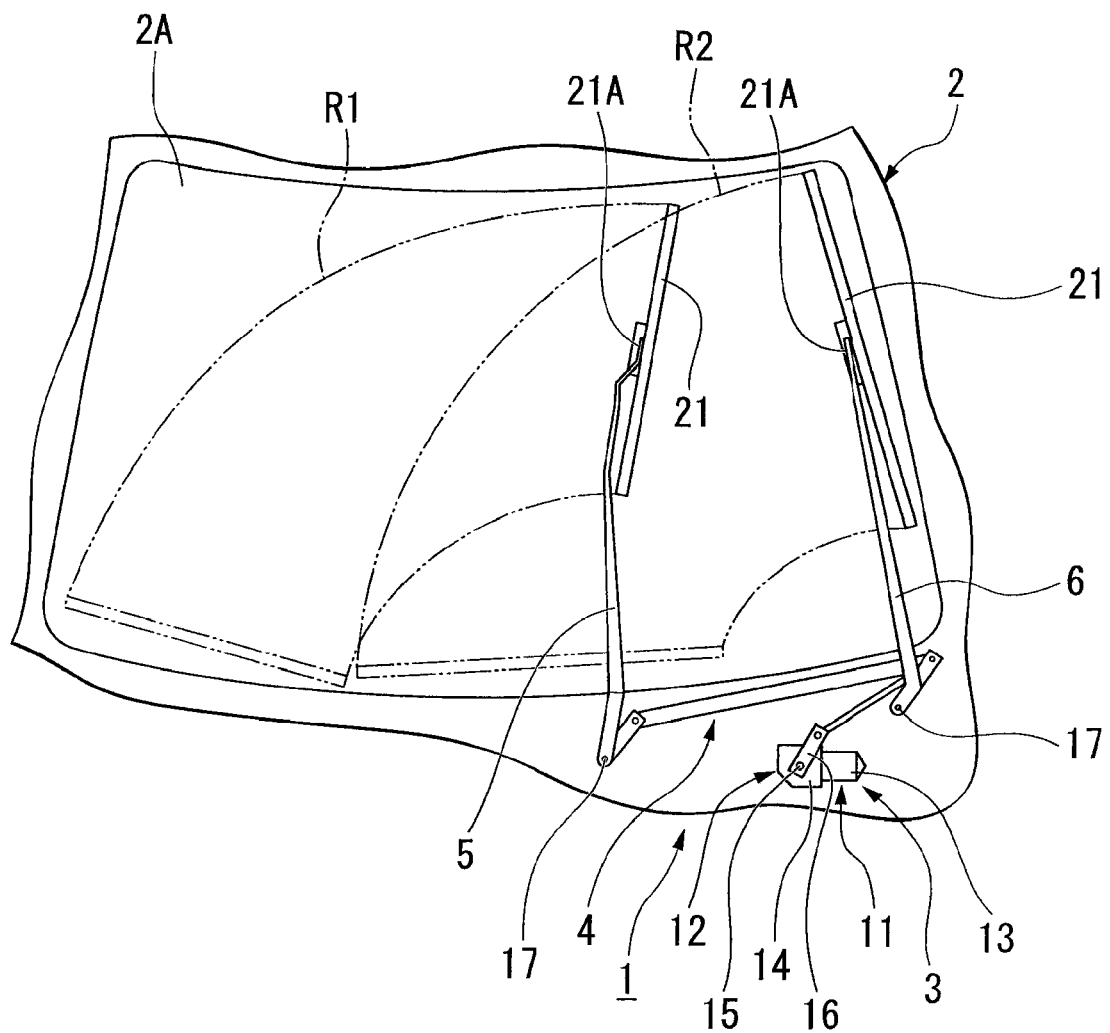
FIG. 1 is a view showing the structure of a wiper apparatus fitted with the wiper driving apparatus according to an embodiment of the present invention.

1 Wiper apparatus
2 Vehicle body

2A Windshield
3 Wiper motor
5, 6 Wiper arm
21 Wiper blade
31 Wiper driving apparatus
33 IG switch (Second switch)
34 Mist switch (First switch)
35 Wiper switch
42 CPU (Wiper operating unit)
PD3, PP3, PD6, PP6 Positions (First stop range)
RA1 First wiping range
RA2 Second wiping range
RA3 Third wiping range

BEST EMBODIMENTS FOR IMPLEMENTING THE INVENTION

The best embodiments for implementing the invention will now be described in detail with reference made to the drawings. Note that the same symbols are used for the same component elements in each of the embodiments described below. Moreover, duplicate descriptions have been omitted from the respective embodiments.

(First Embodiment)

As is shown in FIG. 1, a wiper apparatus 1 is mounted in a vehicle 2 and has a structure in which a wiper motor 3 is joined via a linking mechanism 4 to a pair of wiper arms 5 and 6.

The wiper motor 3 has a motor body 11, and a deceleration mechanism portion 12 which decelerates and then outputs a rotation of the motor body 11. The motor body 11 is formed by a DC brush motor, and field magnets and brushes (not shown) are fixed inside a motor housing 13, and an armature provided with a commutator is rotatably housed therein. Note that a brushless DC motor or another type of motor may also be used for the motor body 11.

The deceleration mechanism portion 12 of the wiper motor 3 has a worm gear which forms the deceleration mechanism provided inside a gear housing 14. A rotation shaft of the armature which extends inside the gear housing 14 is fixed to a worm, and an output shaft 15 is fixed to a worm wheel which meshes with this worm. The output shaft 15 extends outside the gear housing 14, and is connected to a crank arm 16. The crank arm 16 is connected to the link mechanism 4. The link mechanism 4 is formed with a pair of wiper shafts 17 as support points. When the crank arm 16 is rotated, the pair of wiper arms 5 and 6 are able to oscillate using the wiper shafts 17 as support points.

A wiper blade 21 is removably attached to each one of the wiper arms 5 and 6. The wiper blades 21 place rubber under pressure against a windshield 2A by means of spring components fitted inside the wiper arms 5 and 6.

Figure 2:
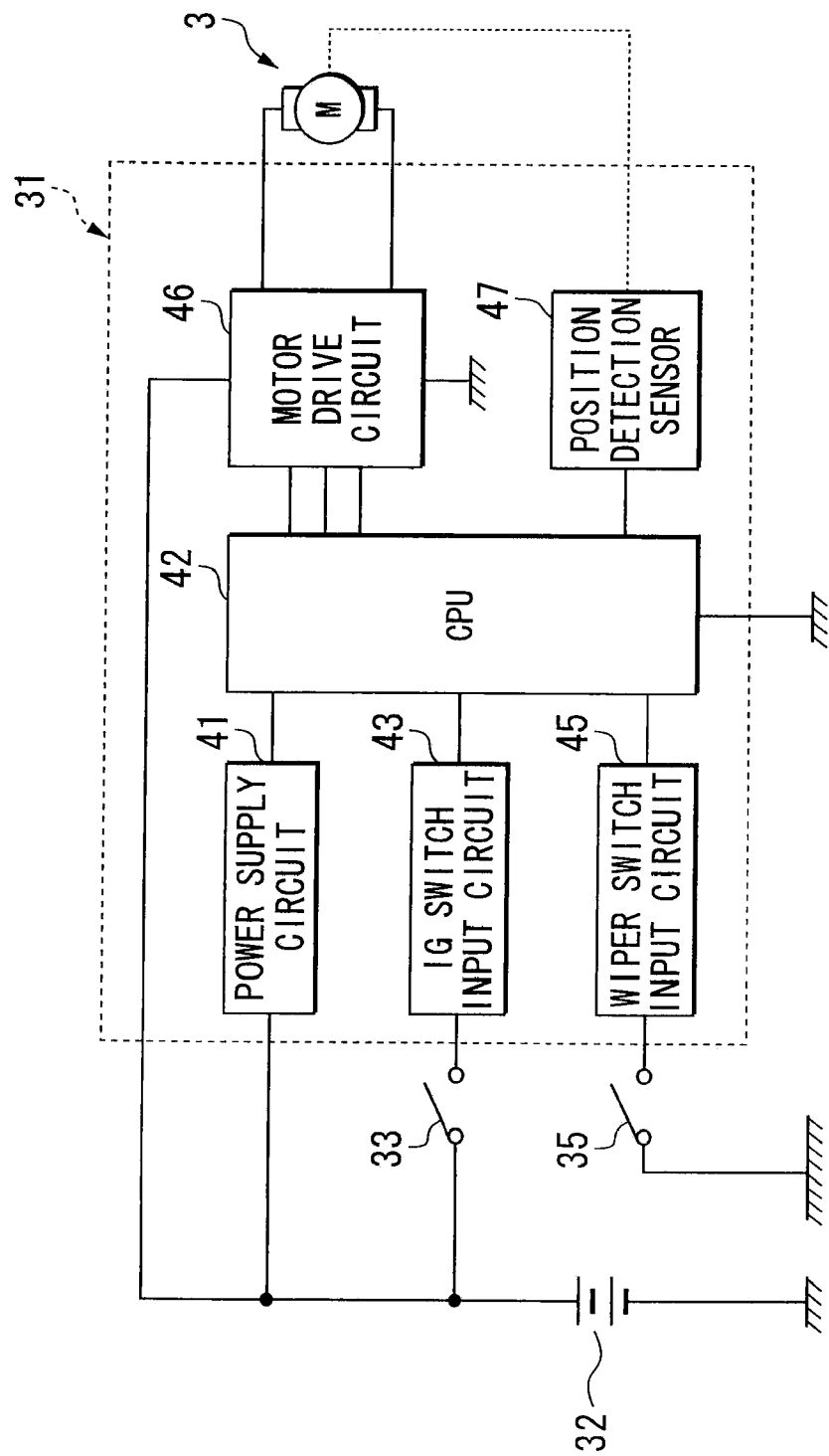
FIG. 2 is a block diagram of the wiper driving apparatus mounted in the wiper apparatus according to a first embodiment of the present invention.

Here, a wiper driving apparatus 31 which governs the control of the wiper apparatus 1 is housed inside the gear housing 14 of the deceleration mechanism portion 12. As is shown in FIG. 2, the wiper driving apparatus 31 is supplied with power from a power supply 32, and is electrically connected to various switches 33 and 35 located in the vehicle interior, and controls the wiper arms 5 and 6 when manipulated by the driver.

The wiper driving apparatus 31 has a power supply circuit 41, a CPU (central processing unit) 42 which forms a wiper operating portion, an IG (ignition) switch input circuit 43, a wiper switch input circuit 45, a motor drive circuit 46, and a position detection sensor 47. The power supply circuit 41 has a circuit structure which converts voltage from the power supply 32 into operating voltage for the CPU 42.

The CPU 42 has ROM (read only memory), RAM (random access memory), and a timer and the like, and programs and data which are used for control are housed in the ROM. The IG switch input circuit 43 outputs a signal to the CPU 42 when the IG switch 33 (i.e., the second switch) of the vehicle 2 is turned ON. The wiper switch input circuit 45 outputs a signal to the CPU 42 when the wiper switch 35 is turned ON.

The motor drive circuit 46 has a switching elements and the like, and controls the flow of electricity to the wiper motor 3. The position detection sensor 47 may be formed, for example, by a magnetoresistive sensor. When a magnetoresistive sensor is used, a rotation detection magnet which has been magnetized with the N pole and S pole in the circumferential direction is provided on the output shaft 15 of the worm wheel, and the magnetoresistive sensor is placed adjacent to this magnet. When the wiper motor 3 has been driven, the rotation detection magnet rotates in conjunction with the rotation of the output shaft 15. Because the position detection sensor 47 outputs a signal each time the magnetic pole of the rotation detection magnet changes, by performing data processing on the signals, it is possible to calculate the position of the wiper blades 21. Note that a Hall IC or the like may also be used for the position detection sensor 47.

Figure 3:
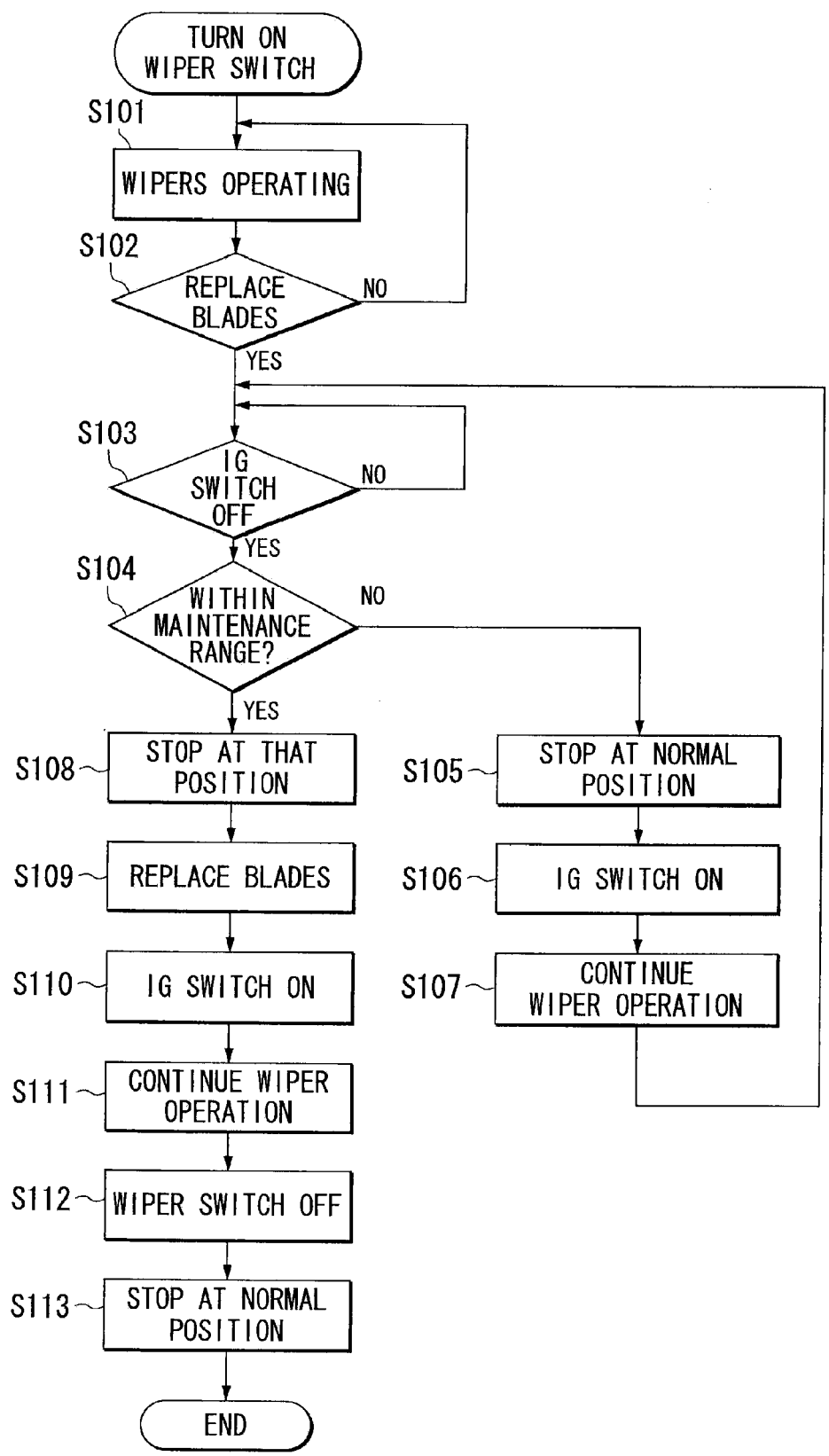
FIG. 3 is a flowchart for when control of a wiper arm is performed in accordance with the position of the wiper blade when the ignition switch is OFF.

Next, an operation of the wiper apparatus 1 will be described while referring mainly to the flowchart in FIG. 3.

When the wiper switch 35 is turned ON the wiper apparatus 1 is operated (step S101). If the blades are not to be replaced (i.e., if the determination in step S102 is NO) then the wiper operation proceeds without any further change.

The CPU 42 controls the rotation of the wiper motor 3 based on signals from the position detection sensor 47, and causes the pair of wiper arms 5 and 6 to oscillate between an upper inverted position and a lower inverted position. The wiper blade 21 which is attached to the wiper arm 5 on the driver's side moves reciprocatingly within an area R1, and the rubber thereof wipes water droplets and dirt away from the windshield 2A. In the same way, the wiper blade 21 which is attached to the wiper arm 6 on the passenger's side moves reciprocatingly within an area R2, and the rubber thereof wipes water droplets and dirt away from the windshield 2A.

In contrast to this, if the blades are to be replaced, the IG switch 33 is turned OFF (step S103). The CPU 42 checks whether or not the position of the wiper blades 21 (referred to below as the blade position) when the IG switch 33 was turned OFF was within a previously set maintenance range (a first stop range) (step S104). The CPU 42 determines this blade position based on the output from the position detection sensor 47.

If the blade position is outside the maintenance range (i.e., if the determination in step S104 is NO), the CPU 42 causes the wiper blades 21 to move automatically to a normal position, for example, to a bottom inverted position or to a housing position, and then stops the movement of the wiper blades 21 (step S105). Thereafter, if the IG switch 33 is turned ON (step S106), the wiper operation is continued (step S107), and the routine returns to step S103.

In contrast to this, if the blade position when the IG switch 33 was turned OFF is within the maintenance range (i.e., if the determination in step S104 is YES), the CPU 42 stops the wiper arms 5 and 6 in that position (step S108). In that position, once the blades have been replaced (step S109), the IG switch 33 is turned ON (step S110). Because the wiper switch 35 is still ON, a normal wiping operation continues (step S111). If the wiper switch 35 is turned OFF (step S112), then once the wiper blades 21 have moved to a normal position, the wiper arms 5 and 6 are stopped (step S113).

Here, a description will be given of the maintenance range which is the first stop range using specific examples.

Figure 4:
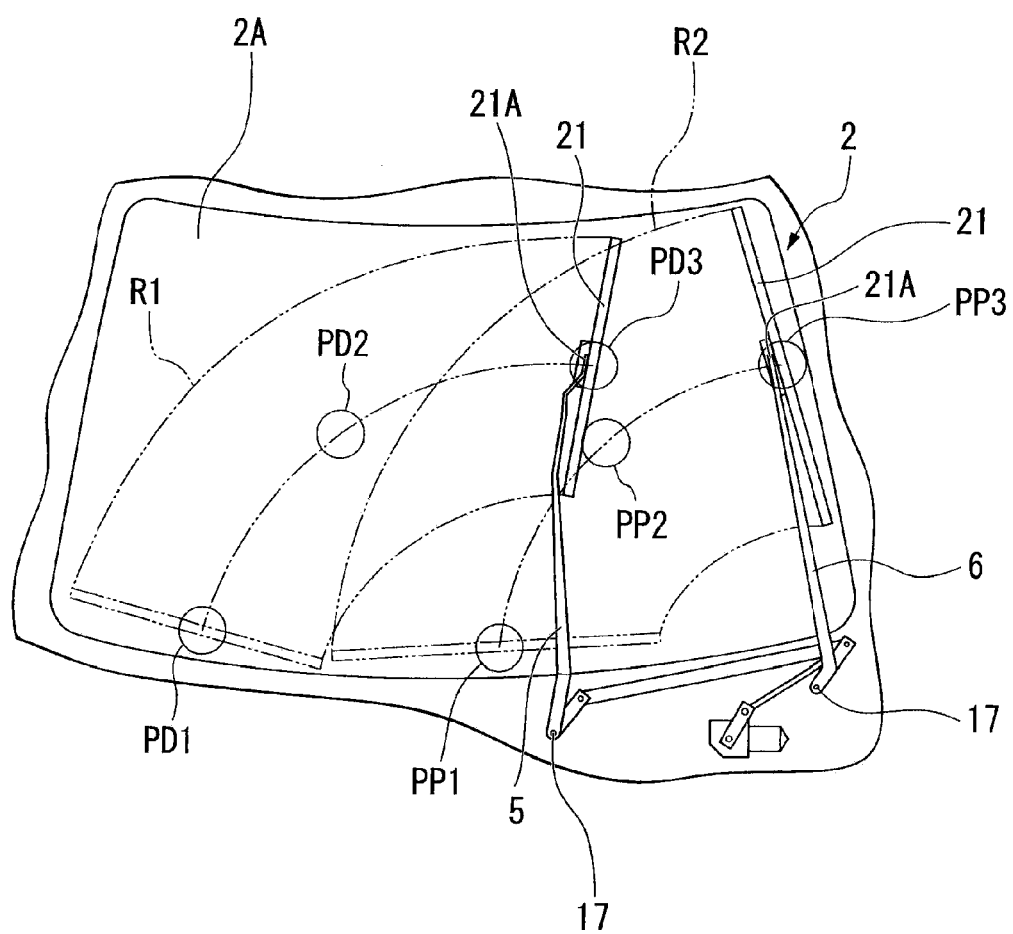
FIG. 4 is a view illustrating a maintenance range of a tandem type of wiper apparatus.

FIG. 4 shows a maintenance range for a tandem type of wiper apparatus in which the pair of wiper arms 5 and 6 move in the same direction. The operating range of the wiper blade 21 which wipes the driver's side is shown by the area R1, while the operating range of the wiper blade 21 which wipes the passenger's side is shown by the area R2. Because the wiper blades 21 are fitted respectively to the wiper arms 5 and 6 by means of arm connecting portions 21A, when the blades are being replaced the operator must be able to reach the arm connecting portions 21A. For example, because positions PD1 and PP1 which correspond to a bottom inverted position and a housing position are located in the vicinity of the center of the bottom portion, they are difficult to reach. In the same way, because positions PD2 and PP2 are also in the vicinity of the center of the windshield 2A, they are also difficult to reach.

In contrast to this, at positions PD3 and PP3 which correspond to the top inverted positions, because the wiper arm 6 is at the end on the passenger's side of the vehicle 2, and the arm 5 is also closer towards the end on the passenger's side from the center of the vehicle 2, they are easy to reach. Accordingly, the vicinities of the positions PD3 and PP3 are within the maintenance range. Although the vicinities of the positions PD3 and PP3 differ depending on the size of the vehicle 2, they are approximately 10° from the top inverted position and include the top inverted position. Depending on the shape of the vehicle and the like, they may also be approximately 20° from the top inverted position and include the top inverted position. Within this angular range, the replacement task can be performed easily.

Figure 5:
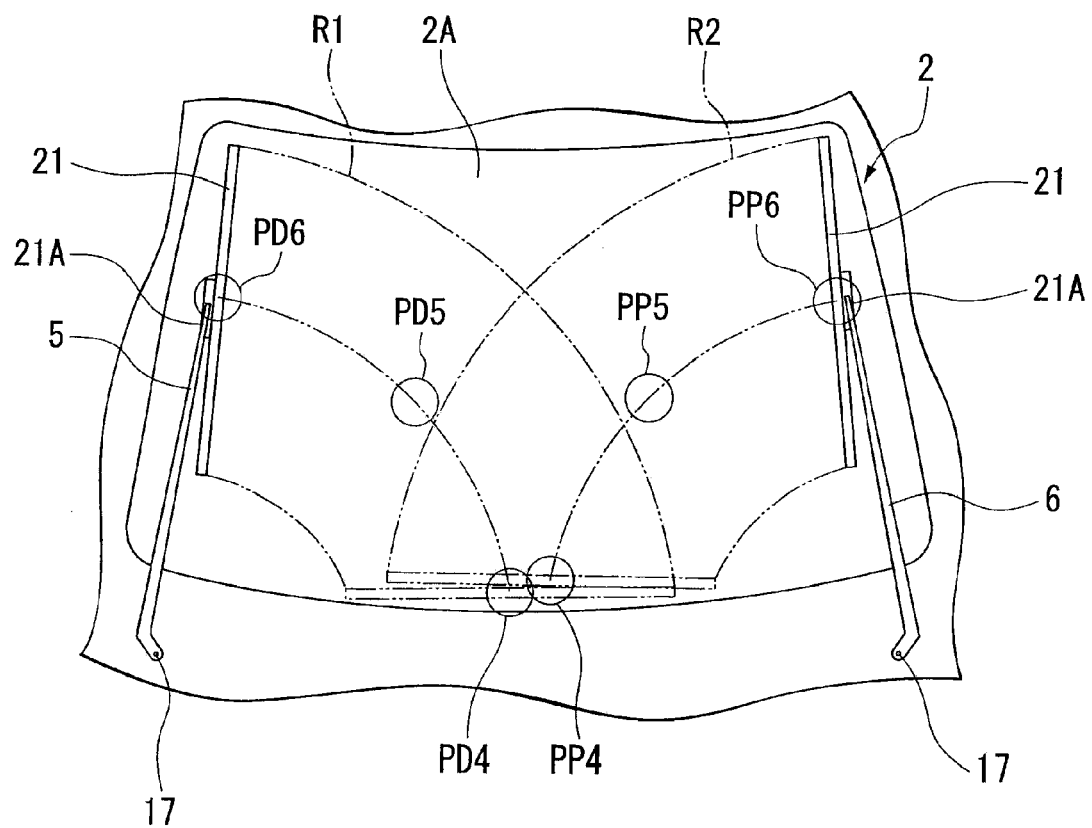
FIG. 5 is a view illustrating a maintenance range of an opposite type of wiper apparatus.

FIG. 5 shows the maintenance range in an opposite type of wiper apparatus in which wiper shafts 17 are located respectively on the driver's side and the passenger's side. Because the arm connecting portions 21A of the wiper blades are in the vicinity of the center of the bottom portions of the windshield 2A, positions PD4 and PP4 which correspond to the bottom inverted position and housing position in the same way as in FIG. 4 are difficult to reach. Because positions PD5 and PP5 are close to the center of the windshield 2A, workability at these positions is poor. In the vicinity of positions PD6 and PP6 which correspond to the top inverted positions, because these positions are each at an end of the vehicle 2, they provide excellent workability. Accordingly, the vicinity of the positions PD6 and PP6 are within a suitable maintenance range. Although the vicinities of the positions PD6 and PP6 differ depending on the size of the vehicle 2, they are desirably approximately 20° from the top inverted position and include the top inverted position. Within this angular range, the replacement task can be performed easily.

In this embodiment, when the wiper apparatus 1 is operating, if the IG switch 33 is turned OFF when the wiper blades 21 are within an easy replacement range, then it is possible to stop the wiper motor 3 at that position. In contrast to this, at other positions, the wiper arms 5 and 6 return to their stop positions. Accordingly, it is possible to stop the wiper arms 5 and 6 in blade replacement positions even in a wiper apparatus 1 in which the wiper arms 5 and 6 automatically return to their stop positions. Because it is possible to stop them at visually confirmed positions, it is easy for the driver to accept these positions for the blade replacement positions. Because the blade replacement positions are not set as pinpoint positions but as positions within a predetermined range, the wiper arms 5 and 6 can be stopped reliably.

It is also possible to establish control such that, if the IG switch 33 is turned OFF while the wipers are in operation, they always move to the blade replacement position.

(Second Embodiment)

The characteristic of this embodiment is the fact that, in the wiper apparatus 1 shown in FIG. 1 and FIG. 2, the wiper operating unit, namely, the CPU 42 changes the stopping operation in accordance with the position of the wipers when stopped.

Figure 6:
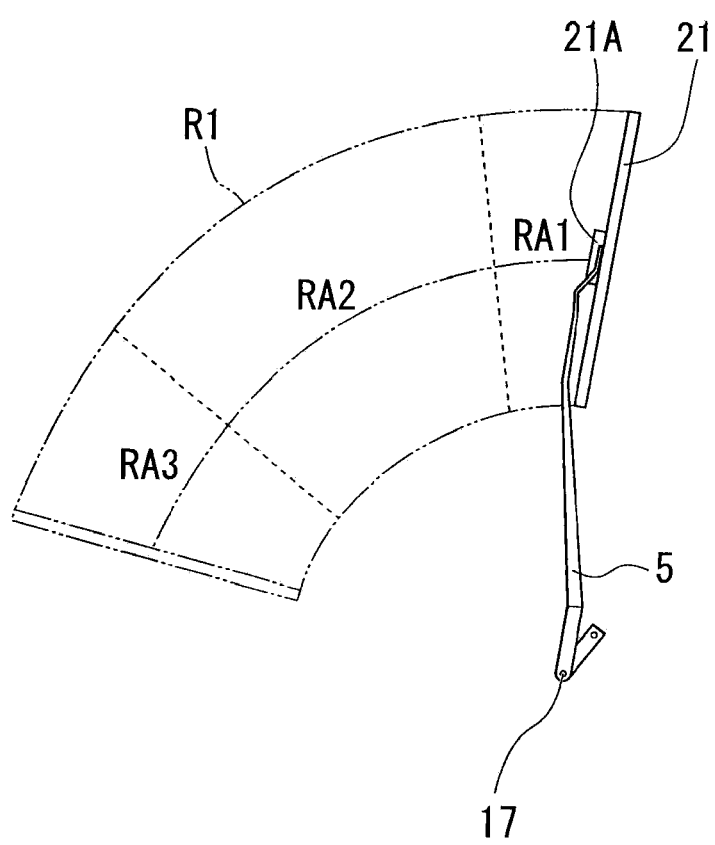
FIG. 6 is a view showing a typical illustration of first, second, and third wiping ranges.

FIG. 6 is a typical view showing divisions of the wiping range of the wiper arm 5. The wiping range of the wiper arm 5 is divided into a first wiping range RA1 which includes the top inverted position, a second wiping range RA2 which is below the first wiping range RA1, and a third wiping range RA3 which includes the bottom inverted position or the housing position. The first wiping range RA1 is a range, for example, of about 20° which includes the top inverted position. The third wiping range RA3 is a range, for example, of about 20° which includes the bottom inverted position or the housing position. The second wiping range RA2 is the area formed between the first and third wiping ranges RA1 and RA3. Note that the wiping range of the wiper arm 6 is also divided in the same way into the first, second, and third wiping ranges RA1, RA2, and RA3.

Figure 7:
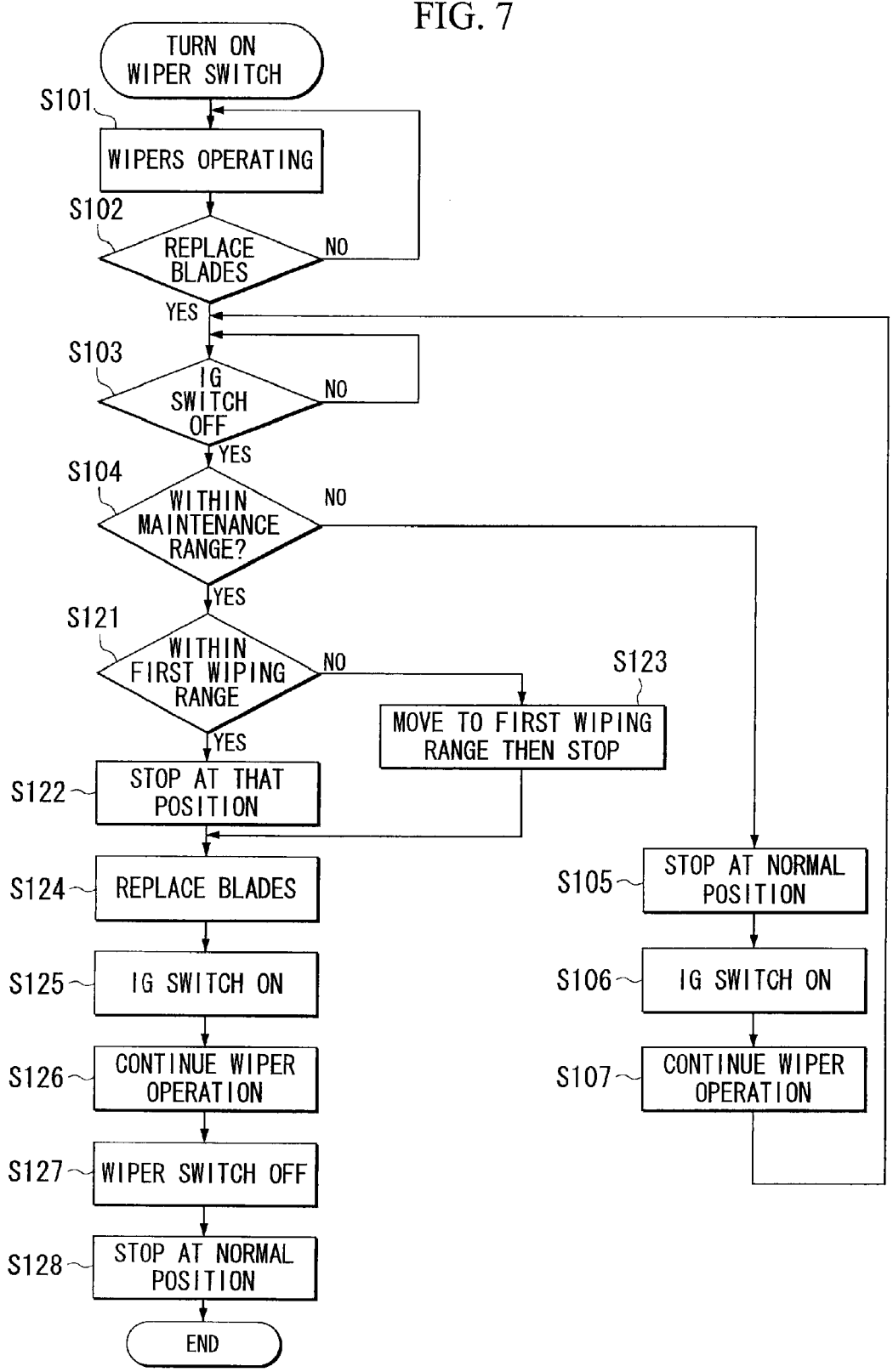
FIG. 7 is a flowchart for when control of a wiper arm is performed in accordance with the position of the wiper blade when the ignition switch is OFF.

A description will now be given of an operation of the wiper apparatus 1 with reference made mainly to the flowchart in FIG. 7.

Once the IG switch has been turned OFF in order to replace the wiper blades by performing the processing of step S101 through step S103, the CPU 42 checks whether the wiper arms 5 and 6 are within their maintenance range (step S104). Here, maintenance range refers to when the wiper arms 5 and 6 are within the first wiping range RA1 or the second wiping range RA2. The positions of the wiper arms 5 and 6 are detected by the position detection sensor 47. If the wiper arms 5 and 6 are not within the maintenance range (i.e., if the determination in step S104 is NO), namely, when the wiper arms 5 and 6 are within the third wiping range RA3, steps S105 through S107 are implemented. The wiper arms 5 and 6 are stopped at either the bottom inverted position or the housing position which are normal positions.

When the wiper arms 5 and 6 are within the maintenance range (i.e., when the determination in step S104 is YES), then the wiper arms 5 and 6 are stopped at those positions (step S122). If the wiper arms 5 and 6 are not within the first wiping range RA1 (i.e., if the determination in step S121 is NO), namely, if the wiper arms 5 and 6 have moved from the top inverted position towards the bottom inverted position and are within the second wiping range RA2, they are moved to the first wiping range RA1 and are then stopped (step S123). At this time, because there are cases in which the wiper arms 5 and 6 have gone beyond the top inverted position and are in the process of returning to the bottom inverted position or the housing position, in these cases the CPU 42 first moves the wiper arms 5 and 6 to the bottom inverted position or the housing position and then moves them to the first wiping range RA1, and then stops them after this movement.

Blade replacement is then performed within the first wiping range RA1 (step S124). When the IG switch 33 is turned ON (step S125), the wiper operation is allowed to continue (step S126). In this case, the wiper arms 5 and 6 move from the blade replacement position to the bottom inverted position and, thereafter, shift to a normal wiping operation. When the wiper switch 35 is turned OFF (step S127), the wiper blades 5 and 6 are stopped in their normal positions (step S128).

Notes that the processing from step S124 through step S128 is the same as the processing from step S109 through step S113 of the first embodiment. When the IG switch 33 is turned ON in step S125, then if the wiper switch 35 is OFF, the CPU 42 causes the wiper arms 5 and 6 to move to the bottom inverted position or housing position, and stops them at this position.

In this embodiment, the wiping ranges R1 of the wiper arms 5 and 6 are divided into 3 ranges, and when the IG switch 33 is turned OFF with the wiper arms 5 and 6 in the first wiping range RA1 where blade replacement can be performed easily, the wiper arms 5 and 6 are stopped in that position. Furthermore, if the wiper arms 5 and 6 are stopped in the second wiping range RA2, they are first returned to the first wiping range RA1 and are then stopped. Accordingly, it is possible to stop the wiper arms 5 and 6 easily in blade replacement positions even in a wiper apparatus 1 in which the wiper arms 5 and 6 automatically return to their stop positions. Because it is possible to stop the wiper arms 5 and 6 in the first wiping range RA1 where blade replacement is easily performed even when the IG switch 33 is turned OFF when the wiper arms 5 and 6 are in the second wiping range RA2, it is easy to reflect the intention of the driver.

If the IG switch 33 is turned OFF when the wiper arms 5 and 6 are in the second wiping range RA2, or during the return movement after the blades have been replaced, the wiper arms 5 and 6 are made to operate in accordance with a normal wiping operation. Consequently, no special processing is required.

Note that the present invention is not limited to the above described embodiments and can be broadly applied.

For example, the sizes of the first, second, and third wiping ranges RA1, RA2, and RA3 are not limited to the proportions illustrated in the drawings. Various modifications are possible such as the third wiping range RA3 being made larger than the second wiping range RA2. It is also possible for the wiper apparatus 1 of the second embodiment to be an opposite type of wiper apparatus such as that shown in FIG. 5.

In step S123 of the second embodiment, even if the wiper arms 5 and 6 are not currently moving from the top inverted position towards the bottom inverted position, if they are within the second wiping range RA2, then it is possible for them to still be moved to the first wiping range RA1 and then stopped.

(Third Embodiment)

This embodiment has the characteristic that a mist switch input circuit is provided in the wiper apparatus 1 shown in FIG. 1 and FIG. 2.

Figure 8:
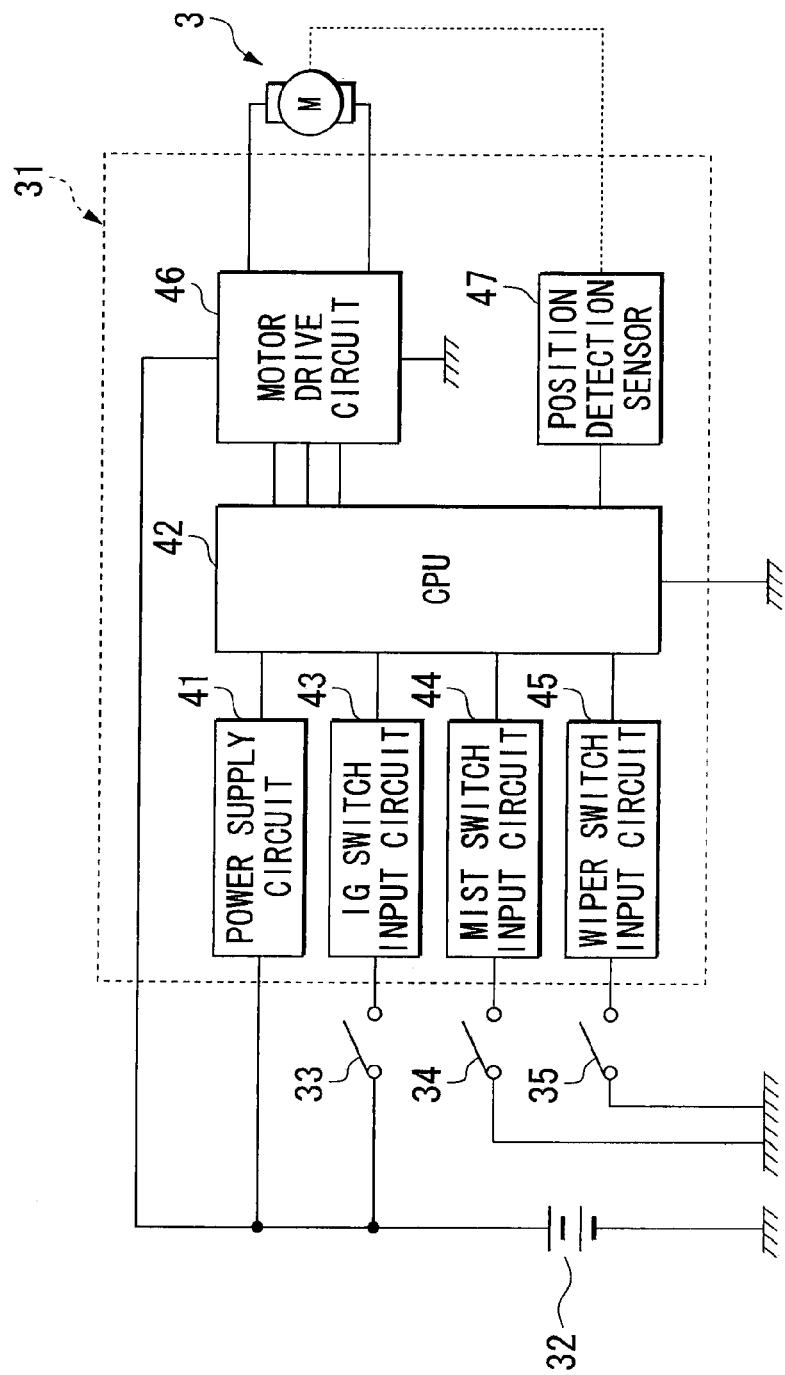
FIG. 8 is a block diagram of the wiper driving apparatus mounted in the wiper apparatus according to a third embodiment of the present invention.

The wiper driving apparatus 31 shown in FIG. 8 has a power supply circuit 41, a CPU (central processing unit) 42 which forms a wiper operating portion, an IG (ignition) switch input circuit 43, a mist switch input circuit 44, a wiper switch input circuit 45, a motor drive circuit 46, and a position detection sensor 47. The power supply circuit 41 has a circuit structure which converts voltage from the power supply 32 into operating voltage for the CPU 42.

The CPU 42 has ROM (read only memory), RAM (random access memory), and a timer and the like, and programs and data which are used for control are housed in the ROM. The IG switch input circuit 43 outputs a signal to the CPU 42 when the IG switch 33 (i.e., the second switch) of the vehicle 2 is turned ON. The mist switch input circuit 44 outputs a signal to the CPU 42 when a mist switch 34 (i.e., a first switch) is turned ON. The mist switch 34 is an automatic return switch which is urged in the OFF direction by a spring component (not shown) and is only ON while the driver is holding it. The wiper switch input circuit 45 outputs a signal to the CPU 42 when the wiper switch 35 is turned ON.

Figure 9:
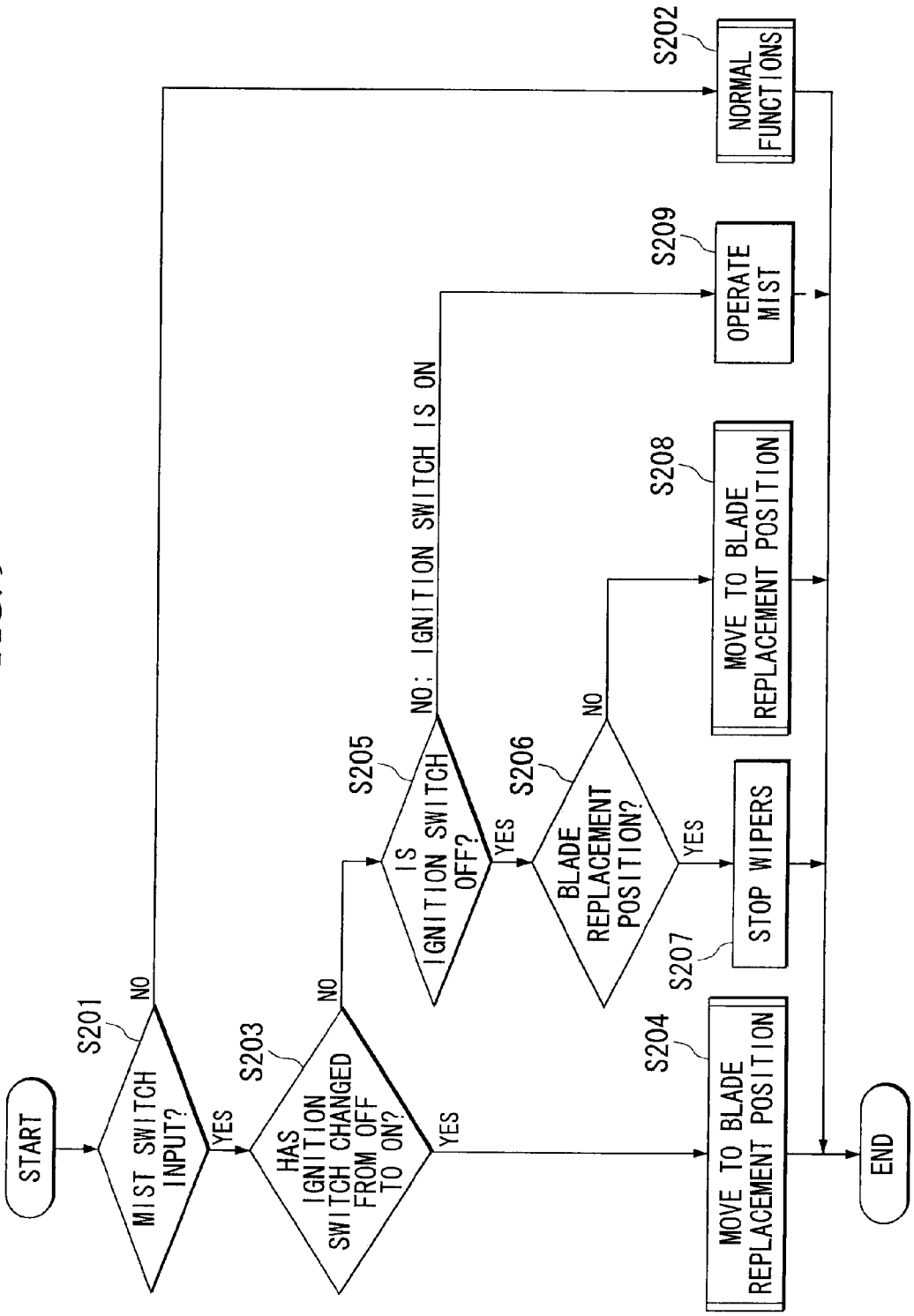
FIG. 9 is a flowchart for the blade replacement according to the third embodiment of the present invention.

Next, an operation of the wiper apparatus 1 will be described while referring mainly to the flowchart in FIG. 9. The wiper driving apparatus 31 determines whether or not an input has been made to the mist switch 34 (step S201). When the signal from the mist switch input circuit 44 is OFF, the mist switch 34 determines that no input has been made (i.e., that the determination in step S201 is NO) and performs a normal wiping operation (step S202). The CPU 42 controls the rotation of the wiper motor 3 based on signals from the position detection sensor 47 and causes the pair of wiper arms 5 and 6 to oscillate between the upper inverted position and the lower inverted position.

The wiper blade 21 which is attached to the wiper 5 on the driver's side moves reciprocatingly within the area R1, and the rubber thereof wipes water droplets and dirt away from the windshield 2A. In the same way, the wiper blade 21 which is attached to the wiper arm 6 on the passenger's side moves reciprocatingly within an area R2, and the rubber thereof wipes water droplets and dirt away from the windshield 2A.

If the mist switch 34 is turned ON (i.e., if the determination in step S201 is YES), then whether or not the IG switch 33 has changed is checked (step S203). When the signal from the IG switch input circuit 43 changes from ON to OFF (i.e., when the determination in step S203 is YES), the wiper arms 5 and 6 are moved under the control of the CPU 42 to blade replacement positions (i.e., to first stop positions) (step S204). The blade replacement positions are in the vicinity of the top inverted positions from positions which exclude the bottom inverted positions and housing positions. The vicinity of the top inverted position has a range of 20° and includes the top inverted position. Within this range, the replacement task can be performed easily. Note that this range differs depending on the shape and size of the vehicle 2.

Except for when the IG switch input circuit 42 changes from ON to OFF (i.e., when the determination in step S203 is NO), the processing branches further depending on whether the IG switch 33 is ON or OFF (step S205). When the IG switch 33 is OFF (i.e., when the determination in step S205 is YES), then if the wiper blades 5 and 6 are already in their blade replacement positions (i.e., if the determination in step S206 is YES), the wiper apparatus 1 is stopped (step S207). If the wiper arms 5 and 6 are not in their blade replacement positions (i.e., if the determination in step S206 is NO), then the wiper arms 5 and 6 are moved to their blade replacement positions (step S208).

If, however, the IG switch 33 is ON in step S205, (i.e., if the determination in step S205 is NO), then a wiping operation is implemented while a mist spray is being jetted onto the windshield (step S209).

Figure 10:
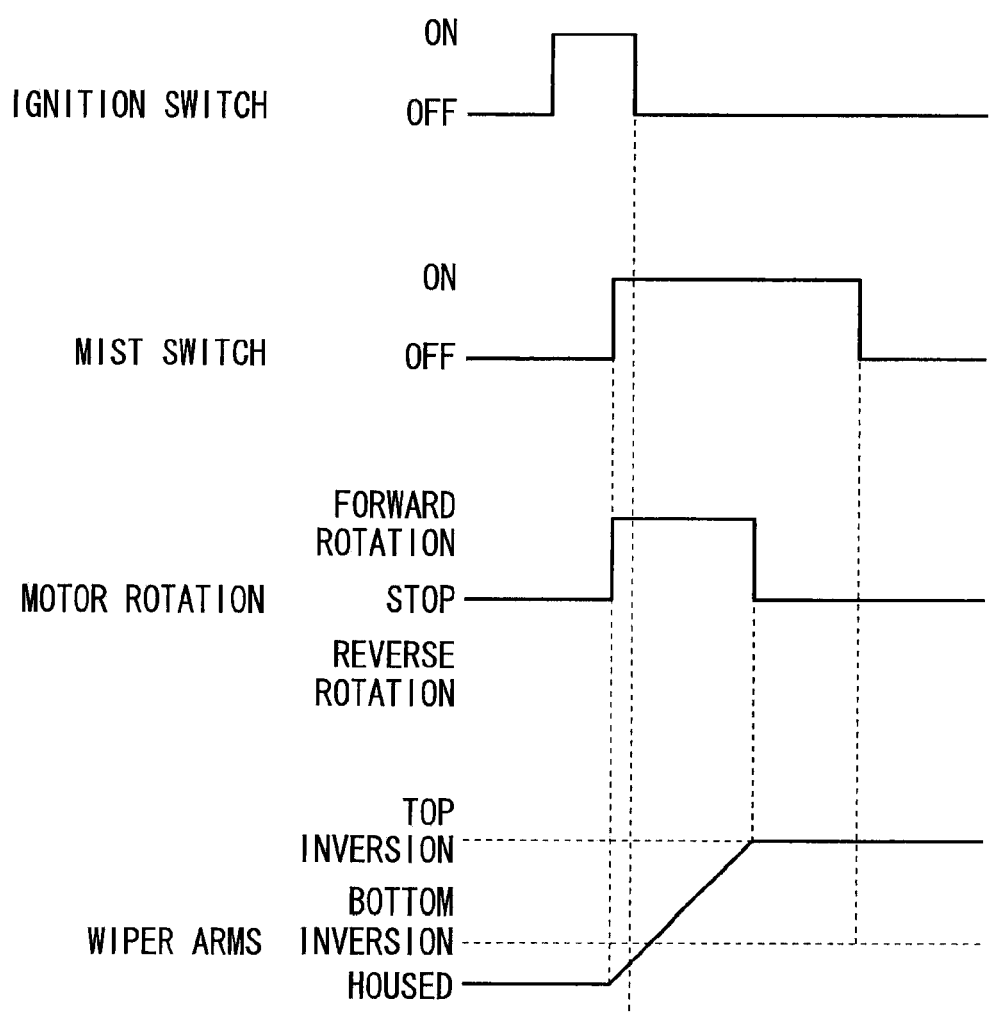
FIG. 10 is a timing chart for moving from a housing position to a blade replacement position according to the third embodiment of the present invention.

FIG. 10 shows an example of a timing chart which is followed when the housed wiper arms 5 and 6 are moved to the blade replacement positions. When the IG switch 33 has been turned ON, the mist switch 34 is turned ON and while the mist switch 34 is still ON, the IG switch 33 is turned OFF. The wiper motor 3 rotates normally and the wiper arms 5 and 6 which are in the housing positions are moved to their blade replacement positions, namely, towards the top inverted positions. When they reached the top inverted positions, the wiper motor 3 stops and leaves the wiper arms 5 and 6 at the blade replacement positions. When the driver stops pressing the mist switch 34, the mist switch 34 is turned OFF.

Note that after the wiper blades 21 have been replaced at the top inverted position, then when this operation is canceled, this is performed by operating a combination of the IG switch 33 and various wiper operating switches. For example, if the wiper switch 35 is put on Hi and the IG switch 33 is switched from OFF to ON, then the state in which the wiper arms had been stopped at the blade replacement positions is canceled and a Hi wiping operation is started. Hi refers to a state when the wiping speed of the wiper blades 21 is a fast speed.

If the wiper switch 35 is put on Lo and the IG switch 33 is switched from OFF to ON, then the state in which the wiper arms had been stopped at the blade replacement positions is canceled and a Lo wiping operation is started. Lo refers to a state in which the wiping speed is slower than the Hi wiping speed. Note that the same applies in the switching operations when the wiping speed can be set to three or more different levels instead of two.

If a washer switch (not shown) which sprays jets of washing liquid onto the windshield 2A is turned ON and the IG switch 33 is switched from OFF to ON, then the state in which the wiper arms had been stopped at the blade replacement positions is canceled and a wiping operation is started while jets of washing liquid are being sprayed onto the windshield.

If a switch which selects an intermittent wiping mode (not shown) is turned ON and the IG switch 33 is switched from OFF to ON, then the state in which the wiper arms had been stopped at the blade replacement positions is canceled and an intermittent wiping operation is started.

If the mist switch 34 is turned ON and the IG switch 33 is switched from OFF to ON, then the state in which the wiper arms had been stopped at the blade replacement positions is canceled and a wiping operation is started while a mist is being sprayed onto the windshield.

Note that it is desirable that the wiper arms 5 and 6 do not move if the IG switch 33 is switched from OFF to ON while the wiper switch 35 is turned OFF. This is to prevent the wiper apparatus 1 being driven unintentionally by the driver.

In this embodiment, because the movement to the blade replacement positions and the cancellation of this movement are performed via the operation of two switches, the operation performed in order to replace a wiper blade can be made different from operations which are performed during normal driving, so that erroneous operations can be prevented. Because an automatic return switch is used for the operating mechanism, if a user takes their hand away in order to perform the replacement task or the like, the switch returns to its normal position. The next time the drivers gets in the vehicle, because the switch is in its normal position, there is no possibility of the driver forgetting to restore the switch manually. When the wiper blades are to be moved to the blade replacement positions, because the IG switch 33 is turned OFF, there is even less chance of an erroneous operation occurring. Because no special switch is required to move the wiper blades to the blade replacement positions, the layout of the switches inside the vehicle compartment is made easier.

Note that the automatic return switch is not limited to the mist switch 34. The switch which sprays out a jet of washer solution or a switch which switches the lighting mode of the vehicle headlights to passing may also be used. In this case, the wiper apparatus 1 does not need to include the mist switch 34.

The reason for moving the wiper arms 5 and 6 to the blade replacement position is not limited to blade replacement and, for example, they may also be stopped at the first stopping position so that a load from heavy snow does not weigh on the wiper arms 5 and 6. In this case, the first stopping position functions as a standby position instead of as a replacement position.

What is claimed is:

1. A wiper driving apparatus which is provided with a wiper operating unit which causes wiper arms which are fitted with wiper blades that come into contact with a windshield to oscillate between a top inverted position and a bottom inverted position, wherein:
   the wiper operating unit causes the wiper arms to move in accordance with operations of a first switch and a second switch which are provided in a vehicle interior,
   the first switch is an automatic return switch which has been turned ON while the first switch is held,
   the second switch is an ignition switch, and
   when the first switch has been turned ON and the second switch is changed from ON to OFF, the wiper operating unit causes the wiper arms to move to a predetermined first stop position located above the bottom inverted position.

2. The wiper apparatus according to claim 1, wherein the first stop position includes the top inverted position and a range of up to 20° from the top inverted position.

3. The wiper apparatus according to claim 2, wherein the first switch is a mist switch which is electrically connected to the wiper operating unit.

4. The wiper apparatus according to claim 2, wherein, when a switch which operates the wiper arms or a switch which discharges jets of washing liquid has been turned ON and the second switch which is provided in a vehicle interior is changed from OFF to ON, the wiper operating unit cancels the stopping of the wiper arms at the first position.

5. The wiper apparatus according to claim 1, wherein the first switch is a mist switch which is electrically connected to the wiper operating unit.

6. The wiper apparatus according to claim 5, wherein, when a switch which operates the wiper arms or a switch which discharges jets of washing liquid has been turned ON and the second switch which is provided in a vehicle interior is changed from OFF to ON, the wiper operating unit cancels the stopping of the wiper arms at the first position.

7. The wiper apparatus according to claim 1, wherein, when a switch which operates the wiper arms or a switch which discharges jets of washing liquid has been turned ON and the second switch which is provided in a vehicle interior is changed from OFF to ON, the wiper operating unit cancels the stopping of the wiper arms at the first position.

* * * * *